(12) United States Patent
Chen et al.

(10) Patent No.: US 11,740,997 B2
(45) Date of Patent: Aug. 29, 2023

(54) METHOD AND APPARATUS FOR DEBUGGING A DEVICE

(71) Applicant: Beijing Baidu Netcom Science and Technology Co., Ltd., Beijing (CN)

(72) Inventors: Sheng Chen, Beijing (CN); Danfeng Lu, Beijing (CN); Xin Zhao, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 154 days.

(21) Appl. No.: 17/484,938

(22) Filed: Sep. 24, 2021

(65) Prior Publication Data
US 2022/0012165 A1    Jan. 13, 2022

Related U.S. Application Data

(63) Continuation of application No. PCT/CN2020/095191, filed on Jun. 9, 2020.

(30) Foreign Application Priority Data

Dec. 20, 2019    (CN) .......................... 201911326334.7

(51) Int. Cl.
*G06F 11/36* (2006.01)
*G06F 11/30* (2006.01)
*G06F 11/32* (2006.01)

(52) U.S. Cl.
CPC ...... *G06F 11/3656* (2013.01); *G06F 11/3006* (2013.01); *G06F 11/3051* (2013.01);
(Continued)

(58) Field of Classification Search
None
See application file for complete search history.

(56) References Cited

U.S. PATENT DOCUMENTS

2001/0056341 A1* 12/2001 Pennello ............. G06F 11/3636
703/22
2007/0061627 A1* 3/2007 Takagi ................ G06F 11/3664
714/38.1
(Continued)

FOREIGN PATENT DOCUMENTS

CN       202050426 U     11/2011
CN       103338132 A     10/2013
(Continued)

OTHER PUBLICATIONS

Chinese Office Action for Chinese Application No. 201911326334.7, dated Mar. 17, 2021, 9 pages.
(Continued)

*Primary Examiner* — Qing Chen
(74) *Attorney, Agent, or Firm* — Seed IP Law Group LLP

(57) ABSTRACT

Disclosed are a method and apparatus for debugging a device. A particular embodiment of the method comprises: acquiring target running state information of a target device; constructing a running configuration template and a log collection template according to the target running state information; sending the running configuration template and the log collection template to an edge computing device, and receiving target log information sent by the edge computing device, so as to determine actual running state information; when the actual running state information is different from the target running state information, computing state difference information; and finally, modifying the running configuration template by means of the state difference information value information in order to obtain an updated running configuration template, and sending the updated running configuration template to the edge computing device.

20 Claims, 6 Drawing Sheets

(52) U.S. Cl.
CPC ........ *G06F 11/3075* (2013.01); *G06F 11/328* (2013.01); *G06F 11/366* (2013.01)

(56) References Cited

U.S. PATENT DOCUMENTS

| | | | |
|---|---|---|---|
| 2008/0270988 A1* | 10/2008 | Li | G06F 11/362 717/125 |
| 2015/0163199 A1 | 6/2015 | Kailash et al. | |
| 2016/0065653 A1* | 3/2016 | Chen | H04L 41/0813 715/735 |
| 2019/0372844 A1 | 12/2019 | Moats et al. | |

FOREIGN PATENT DOCUMENTS

| | | |
|---|---|---|
| CN | 106484540 A | 3/2017 |
| CN | 106950543 A | 7/2017 |
| CN | 109634802 A | 4/2019 |
| CN | 109684155 A | 4/2019 |
| CN | 109710490 A | 5/2019 |
| CN | 110493341 A | 11/2019 |
| CN | 111092767 A | 5/2020 |

OTHER PUBLICATIONS

International Search Report for PCT Application No. PCT/CN2020/095191, dated Sep. 23, 2020, 4 pages.
International Written Opinion for PCT Application No. PCT/CN2020/095191, dated Sep. 24, 2020, 5 pages.

* cited by examiner

METHOD AND APPARATUS FOR DEBUGGING A DEVICE

CROSS-REFERENCE TO RELATED APPLICATION

This patent application claims priority to Chinese patent Application No. 201911326334.7, filed by Beijing Baidu Netcom Science and Technology Co., Ltd. as the applicant, on Dec. 20, 2019, entitled "Method and Apparatus for Debugging device," the entire disclosure of which is hereby incorporated by reference.

TECHNICAL FIELD

Embodiments of the present disclosure relate to the field of cloud computing technology, and specifically to a method and apparatus for debugging a device.

BACKGROUND

In scenarios of the Internet of Things and edge computing and other scenarios, a smart device is deployed at the side of a network end close to a thing or a source of data. Due to factors such as an unknown deployment site distance, a complex working condition, a poor hardware capability, and an unstable network speed, it is inconvenient for a technician to debug the smart device deployed at the side of the network end when an error occurs in the smart device performing edge computing, that is, it is difficult to position error information in time.

At present, there are two debugging methods for an edge computing device. One method is that, after arriving at the site of the device, the technician directly logs in to the device through an externally connected screen and keyboard, to view a corresponding program log and to position error information, thus performing debugging at the site. The other method is remote debugging, that is, the technician remotely logs in to and accesses the edge computing device based on a cloud, and then view and position the error information.

SUMMARY

Embodiments of the present disclosure propose a method and apparatus for debugging a device.

In a first aspect, embodiments of the present disclosure provide a method for debugging a device, comprising: acquiring target running status information of a target device, the target running status information being used to represent a target running status of the target device when running normally; constructing a running configuration template and a log collection template according to the target running status information, wherein the running configuration template is used to specify at least one piece of running configuration information of the target device when running in the target running status, the log collection template is used to instruct an edge computing device to collect at least one piece of target log information of the target device when running according to the running configuration information, and the edge computing device is electrically connected with the target device; sending the running configuration template and the log collection template to the edge computing device, and receiving target log information sent by the edge computing device; determining actual running status information of the target device through the target log information; determining, in response to the actual running status information being different from the target running status information, status difference value information between the actual running status information and the target running status information; and modifying the running configuration template through the status difference value information to obtain an updated running configuration template, and sending the updated running configuration template to the edge computing device, to cause the edge computing device to debug the target device.

In some embodiments, wherein the acquiring target running status information of a target device comprises: acquiring peak value information of the target device, the peak value information comprising at least one of: a processor frequency peak value, a memory usage peak value, a network bandwidth peak value, or a failure-free time peak value; and determining target running status information corresponding to the peak value information according to a set condition, wherein the set condition comprises at least one of a set threshold value or a target task, the set threshold value is used to represent a proportional relationship between the peak value information and the target running status information, and the target running status information comprises at least one piece of sub-target running status information.

In some embodiments, wherein the constructing a running configuration template and a log collection template according to the target running status information comprises: acquiring device information of the target device, the device information comprising at least one of hardware information or software information; matching the device information with the target running status information, to determine the at least one piece of running configuration information of the target device; and encapsulating the at least one piece of running configuration information into the running configuration template.

In some embodiments, wherein the constructing a running configuration template and a log collection template according to the target running status information comprises: determining, for running configuration information in the at least one piece of running configuration information, log information corresponding to the running configuration information; and encapsulating at least one piece of log information corresponding to the at least one piece of running configuration information into the log collection template.

In some embodiments, wherein the target log information comprises at least one piece of log information, and the determining actual running status information of the target device through the target log information comprises: querying, for log information in the at least one piece of log information in the target log information, sub-running status information corresponding to the log information; and combining at least one piece of sub-running status information corresponding to the at least one piece of log information to constitute the actual running status information of the target device.

In a second aspect, embodiments of the present disclosure provide a method for debugging a device, comprising: receiving a running configuration template and a log collection template sent by a cloud, wherein the running configuration template is used to specify at least one piece of running configuration information of target device when running in a target running status, and the log collection template is used to instruct an edge computing device to collect at least one piece of target log information of the target device when running according to the running configuration information; generating a first control instruction according to running configuration information in the running configuration template, and sending the first control instruction to the target device; sending, in response to detecting target log information belonging to the target device and corresponding to the first control instruction, the target log information to the cloud; and receiving an updated running configuration template sent by the cloud, generating a second control instruction according to running configuration information in the updated running configuration template, and sending the second control instruction to the target device.

In some embodiments, wherein the generating a first control instruction according to running configuration information in the running configuration template comprises: analyzing the at least one piece of running configuration information from the running configuration template; and generating, for running configuration information in the at least one piece of running configuration information, a first control sub-instruction corresponding to the running configuration information.

In some embodiments, further comprising: monitoring, in response to sending the first control instruction to the target device, device log information of the target device; and marking, in response to detecting the device log information, at least one piece of log information being in the device log information and corresponding to the running configuration information as the target log information corresponding to the first control instruction.

In a third aspect, embodiments of the present disclosure provide an apparatus for debugging a device, comprising: a target running status information acquiring unit, configured to acquire target running status information of a target device, the target running status information being used to represent a target running status of the target device when running normally; a template constructing unit, configured to construct a running configuration template and a log collection template according to the target running status information, wherein the running configuration template is used to specify at least one piece of running configuration information of the target device when running in the target running status, the log collection template is used to instruct an edge computing device to collect at least one piece of target log information of the target device when running according to the running configuration information, and the edge computing device is electrically connected with the target device; an information exchanging unit, configured to send the running configuration template and the log collection template to the edge computing device, and receive target log information sent by the edge computing device; an actual running status information determining unit, configured to determine actual running status information of the target device through the target log information; a status difference value information determining unit, configured to determine, in response to the actual running status information being different from the target running status information, status difference value information between the actual running status information and the target running status information; and a debugging unit, configured to modify the running configuration template through the status difference value information to obtain an updated running configuration template, and send the updated running configuration template to the edge computing device, to cause the edge computing device to debug the target device.

In some embodiments, wherein the target running status information acquiring unit comprises: a peak value information acquiring sub-unit, configured to acquire peak value information of the target device, the peak value information comprising at least one of: a processor frequency peak value, a memory usage peak value, a network bandwidth peak value, or a failure-free time peak value; and a target running status information determining sub-unit, configured to determine target running status information corresponding to the peak value information according to a set condition, wherein the set condition comprises at least one of a set threshold value or a target task, the set threshold value is used to represent a proportional relationship between the peak value information and the target running status information, and the target running status information comprises at least one piece of sub-target running status information.

In some embodiments, wherein the template constructing unit comprises: a device information acquiring sub-unit, configured to acquire device information of the target device, the device information comprising at least one of hardware information or software information; a running configuration information matching sub-unit, configured to match the device information with the target running status information, to determine the at least one piece of running configuration information of the target device; and a running configuration template encapsulating sub-unit, configured to encapsulate the at least one piece of running configuration information into the running configuration template.

In some embodiments, wherein the template constructing unit comprises: a log information determining sub-unit, configured to determine, for running configuration information in the at least one piece of running configuration information, log information corresponding to the running configuration information; and a log collection template encapsulating sub-unit, configured to encapsulate at least one piece of log information corresponding to the at least one piece of running configuration information into the log collection template.

In some embodiments, wherein the target log information comprises at least one piece of log information, and the actual running status information determining unit comprises: a sub-running status information querying sub-unit, configured to query, for log information in the at least one piece of log information in the target log information, sub-running status information corresponding to the log information; and an information combining sub-unit, configured to combine at least one piece of sub-running status information corresponding to the at least one piece of log information to constitute the actual running status information of the target device.

In a forth aspect, embodiments of the present disclosure provide an apparatus for debugging a device, comprising: a template receiving unit, configured to receive a running configuration template and a log collection template sent by a cloud, wherein the running configuration template is used to specify at least one piece of running configuration information of target device when running in a target running status, and the log collection template is used to instruct an edge computing device to collect at least one piece of target log information of the target device when running according to the running configuration information; a first controlling unit, configured to generate a first control instruction according to running configuration information in the running configuration template, and send the first control instruction to the target device; a target log information sending unit, configured to send, in response to detecting target log information belonging to the target device and corresponding to the first control instruction, the target log information to the cloud; and a second controlling unit, configured to receive an updated running configuration template sent by the cloud, generate a second control instruction according to running configuration information in the updated running configuration template, and send the second control instruction to the target device.

In some embodiments, wherein the first controlling unit comprises: a running configuration information analyzing sub-unit, configured to analyze the at least one piece of running configuration information from the running configuration template; and a first control sub-instruction generating sub-unit, configured to generate, for running configuration information in the at least one piece of running configuration information, a first control sub-instruction corresponding to the running configuration information.

In some embodiments, further comprising: a device log information monitoring unit, configured to monitor, in response to sending the first control instruction to the target device, device log information of the target device; and a target log information screening unit, configured to mark, in response to detecting the device log information, at least one piece of log information being in the device log information and corresponding to the running configuration information as the target log information corresponding to the first control instruction.

In a fifth aspect, embodiments of the present disclosure provide an electronic device, comprising: one or more processors; and a memory, storing one or more programs, wherein the one or more programs, when executed by the one or more processors, cause the one or more processors to implement the method for debugging a device provided by the first aspect or the second aspect.

In a sixth aspect, embodiments of the present disclosure provide a computer readable medium, storing a computer program thereon, wherein the program, when executed by a processor, causes the processor to implement the method for debugging a device provided by the first aspect or the second aspect.

According to the method and apparatus for debugging a device provided in the embodiments of the present disclosure, the target running status information of the target device is acquired, and the running configuration template and the log collection template are constructed according to the target running status information. The running configuration template and the log collection template are sent to the edge computing device, the target log information sent by the edge computing device is received, and then, the actual running status information is determined. When the actual running status information is different from the target running status information, the status difference value information is calculated. Finally, the running configuration template is modified through the status difference value information to obtain the updated running configuration template, and the updated running configuration template is sent to the edge computing device, to cause the edge computing device to debug the target device.

BRIEF DESCRIPTION OF THE DRAWINGS

After reading detailed descriptions for non-limiting embodiments given with reference to the following accompanying drawings, other features, objectives and advantages of the present disclosure will be more apparent.

DETAILED DESCRIPTION OF EMBODIMENTS

The present disclosure is further described below in detail by combining the accompanying drawings and the embodiments. It may be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
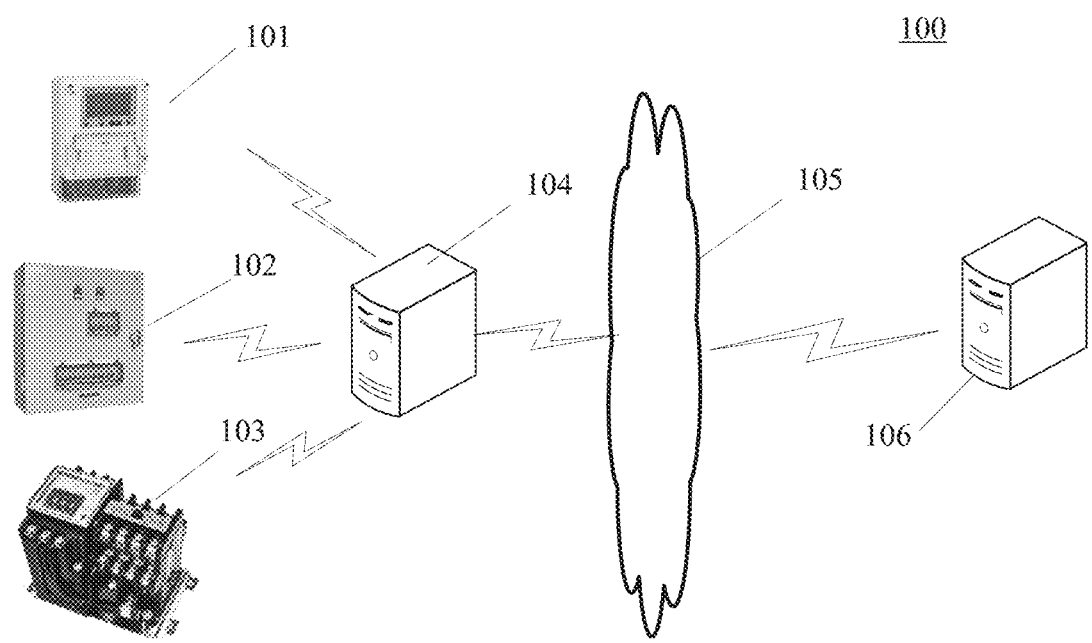
FIG. 1 is a diagram of an exemplary system architecture in which an embodiment of the present disclosure may be applied.

FIG. 1 shows an exemplary system architecture 100 in which a method for debugging a device or an apparatus for debugging a device according to an embodiment of the present disclosure may be applied.

As shown in FIG. 1, the system architecture 100 may include terminal devices 101, 102 and 103, an edge computing device 104, a network 105, and a cloud server 106. The network 105 serves as a medium providing a communication link between the edge computing device 104 and the cloud server 106. The network 105 may include various types of connections, for example, wired or wireless communication links, or optical fiber cables.

The terminal devices 101, 102 and 103 may communicate with the edge computing device 104 to implement data processing. Various communication client applications (e.g., a webpage browser application, a shopping application, a search application, an instant communication tool, a mailbox client, and social platform software) may be installed on the terminal devices 101, 102 and 103.

The terminal devices 101, 102 and 103 may be hardware or software. When being the hardware, the terminal devices 101, 102 and 103 may be various electronic devices having a display screen and supporting data processing, the electronic devices including, but not limited to, a smart phone, a tablet computer, a laptop portable computer, a desktop computer, and the like. When being the software, the terminal devices 101, 102 and 103 may be installed in the above listed electronic devices. The terminal devices may be implemented as a plurality of pieces of software or a plurality of software modules (e.g., software or software modules for providing a distributed service), or as a single piece of software or a single software module, which will not be particularly defined here.

A program for edge computing is installed on the edge computing device 104. The edge computing device 104 may analyze and process data such as a data processing request sent by the terminal devices 101, 102 and 103, and return the data processing result to the terminal devices 101, 102 and 103.

The cloud server 106 may exchange data with the edge computing device 104 via the network 105, to receive to-be-processed information sent by the edge computing device 104, and send the processing result to the edge computing device 104.

It should be noted that the method for debugging a device provided in the embodiments of the present disclosure may be performed separately by the cloud server 106, or may be performed jointly by the cloud server 106 and the edge computing device 104. Correspondingly, the apparatus for debugging a device may be provided in the cloud server 106, or may be provided in the edge computing device 104.

It should be noted that the cloud server 106 and the edge computing device 104 may be hardware or software. When being the hardware, the cloud server 106 and the edge computing device 104 may be implemented as a distributed server cluster composed of a plurality of servers, or may be implemented as a single server. When being the software, the cloud server 106 and the edge computing device 104 may be implemented as a plurality of pieces of software or a plurality of software modules (e.g., software or software modules for providing a distributed service), or may be implemented as a single piece of software or a single software module, which will not be particularly defined here.

It should be appreciated that the numbers of the terminal devices, the edge computing devices, the networks and the cloud servers in FIG. 1 are merely illustrative. Any number of terminal devices, edge computing devices, networks and cloud servers may be provided based on actual requirements.

Figure 2:
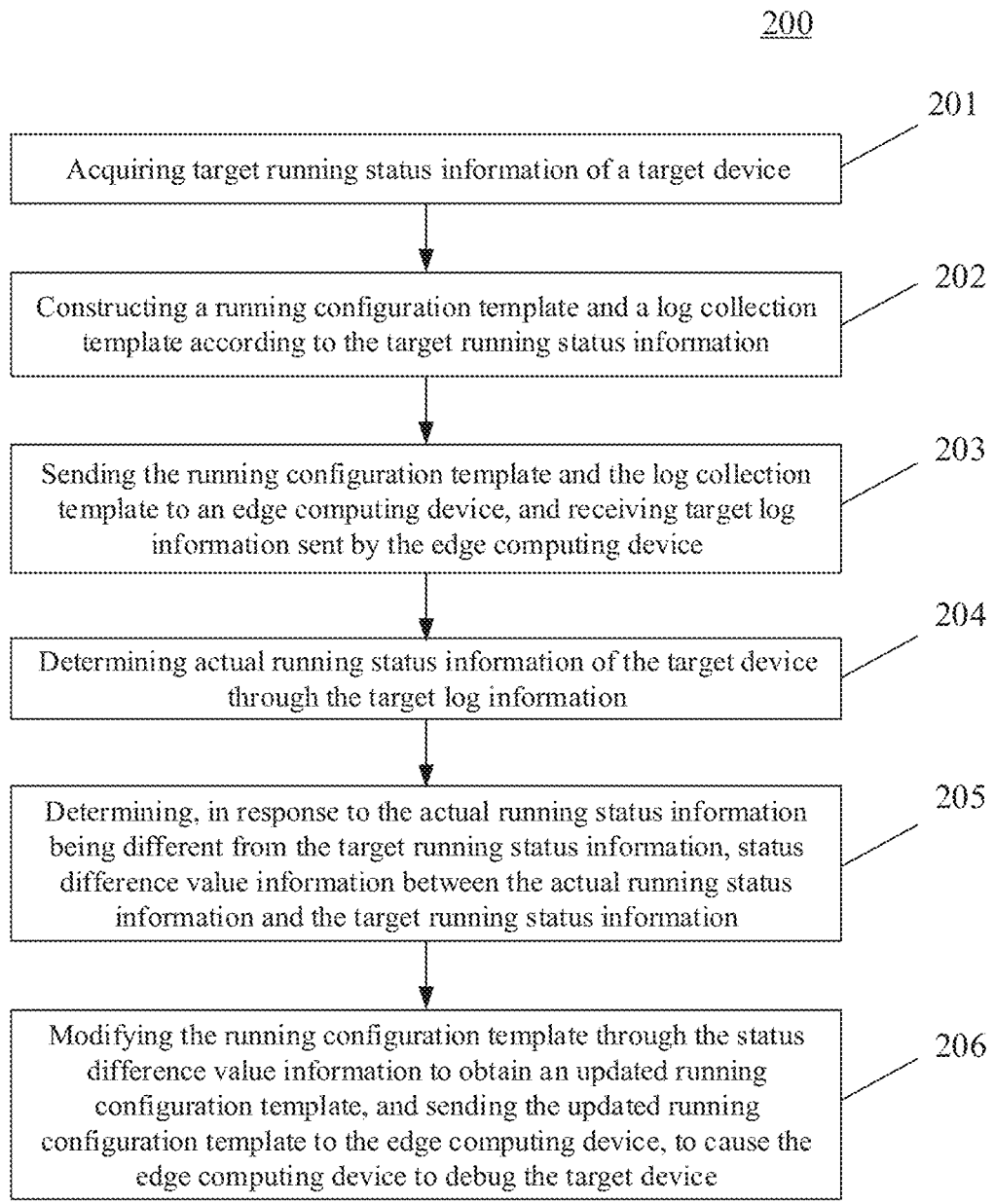
FIG. 2 is a flowchart of an embodiment of a method for debugging a device according to the present disclosure.

Further referring to FIG. 2, FIG. 2 illustrates a flow 200 of an embodiment of a method for debugging a device according to the present disclosure. The method for debugging a device includes the following steps:

Step 201, acquiring target running status information of a target device.

In this embodiment, an executing body (e.g., the cloud server 106 shown in FIG. 1) of the method for debugging a device may acquire the target running status information of the target device (i.e., the terminal devices 101, 102 and 103 in FIG. 1) by means of a wired connection or a wireless connection. It should be noted that the above wireless connection may include, but not limited to, a 3G/4G connection, a WiFi connection, a Bluetooth connection, a WiMAX connection, a Zigbee connection, a UWB (Ultra Wideband) connection, and other wireless connections now known or developed in the future.

At present, in order to realize the debugging for the target device, a technician is generally required to perform a debugging operation in a site where the target device is located. However, in practice, target devices are widely distributed, and there is a problem such as a complex site environment. Moreover, the number of target devices is actually huge, and thus, the technician is required to take a lot of time to complete the debugging for the target devices. Once a target device has a failure, the technician is required to go to the site where the target device is located for debugging. Accordingly, the efficiency of debugging the target device is not high.

For this reason, according to the present disclosure, before the target device is debugged, the target running status information of the target device is first acquired. Here, the above target running status information may be used to represent a target running status of the target device when running normally. The target running status information may be recorded on the executing body when a user registers with the executing body.

In some alternative implementations of this embodiment, the acquiring target running status information of a target device may include the following steps:

In a first step, peak value information of the target device is acquired.

Each index of the target device has peak value information (i.e., a maximum value). The peak value information may be used to represent the maximum bearing capability of the each index of the target device. The above peak value information may include at least one of: a processor frequency peak value, a memory usage peak value, a network bandwidth peak value, or a failure-free time peak value. For different target devices, the peak value information may be different.

In a second step, target running status information corresponding to the peak value information is determined according to a set condition.

According to an actual requirement, the target device may determine the target running status information according to the set condition. That is, the target running status information is status information determined according to the peak value information and the set condition. Here, the set condition may include at least one of: a set threshold value or a target task. The set threshold value may be used to represent a proportional relationship between the peak value information and the target running status information. The target running status information may include at least one piece of sub-target running status information. For example, the sub-target running status information may refer to that a processor utilization rate is 85%, a memory utilization rate is 90%, and the like.

Step 202, constructing a running configuration template and a log collection template according to the target running status information.

After obtaining the target running status information, the executing body may construct the running configuration template and the log collection template that correspond to the target device, according to the target running status information. Here, the running configuration template may be used to specify at least one piece of running configuration information of the target device when running in the target running status. The running configuration information may be a working status of specific hardware or software of the target device. The log collection template may be used to instruct an edge computing device to collect at least one piece of target log information of the target device when running according to the running configuration information. The edge computing device is electrically connected with the target device. By constructing the running configuration template and the log collection template that correspond to the target running status information, there is a debugging standard for the target device, which is conductive to automatically and accurately debugging the target device.

In some alternative implementations of this embodiment, the constructing a running configuration template and a log collection template according to the target running status information may include the following steps:

In a first step, device information of the target device is acquired.

In order to configure the target device, the executing body may first acquire the device information of the target device. Here, the device information includes at least one of hardware information or software information. The hardware information may be processor information, memory information, hard disk information, wireless module information, and the like. The software information may be operating system information, application version information, and the like.

In a second step, the device information and the target running status information are matched, to determine the at least one piece of running configuration information of the target device.

The target running status information is the status information determined according to the peak value information and the set condition. After acquiring the device information of the target device, the executing body may match the device information with the target running status information to further determine the at least one piece of running configuration information of the target device. For example, the target running status information may be how much data is processed per second. At this point, according to the hardware information and the software information of the target device, the executing body may determine a working frequency of a processor, an amount of memory occupied when software is run, and the like. Here, the working frequency of the processor and the amount of memory occupied when the software is run may be two pieces of running configuration information.

In a third step, the at least one piece of running configuration information is encapsulated into the running configuration template.

After determining the at least one piece of running configuration information, the executing body may encapsulate the at least one piece of running configuration information into the running configuration template. Particularly, the running configuration template may contain a data table or a compressed package of an identifier of the target device.

In some alternative implementations of this embodiment, the constructing a running configuration template and a log collection template according to the target running status information may include the following steps:

In a first step, for running configuration information in the at least one piece of running configuration information, log information corresponding to the running configuration information is determined.

After determining the running configuration information, the executing body may set corresponding log information for the running configuration information. For example, the running configuration information is the working frequency of the processor, and thus, the corresponding log information may be the log information for monitoring the working frequency of the processor.

In a second step, at least one piece of log information corresponding to the at least one piece of running configuration information is encapsulated into the log collection template.

After determining the log information, the executing body may encapsulate the log information into the log collection template. The log collection template may contain the identifier of the corresponding target device.

Step 203, sending the running configuration template and the log collection template to an edge computing device, and receiving target log information sent by the edge computing device.

After obtaining the running configuration template and the log collection template, the executing body may send the running configuration template and the log collection template to the edge computing device related to the target device. The edge computing device performs an operation on the target device according to the running configuration template and the log collection template, and thus may acquire the target log information corresponding to the target device. Thereafter, the edge computing device may return the target log information to the executing body.

Step 204, determining actual running status information of the target device through the target log information.

After obtaining the target log information returned by the edge computing device, the executing body may analyze the target log information to determine the actual running status information of the target device.

In some alternative implementations of this embodiment, the target log information includes at least one piece of log information. The determining actual running status information of the target device through the target log information may include the following steps:

In a first step, for log information in the at least one piece of log information in the target log information, sub-running status information corresponding to the log information is queried.

As may be seen from the above, the log information contained in the log collection template corresponds to the running configuration information contained in the running configuration template. After configuring the target device according to the running configuration information contained in the running configuration template, the edge computing device collects the target log information according to the log collection template. That is, the target log information also corresponds to the running configuration information, and reflects the actual running status of the target device under the running configuration information.

After acquiring the target log information, the executing body may determine the sub-running status information of the target device according to the log information contained in the target log information. For example, the sub-running status information may refer to that the processor utilization rate is 80%, the memory utilization rate is 60%, and the like.

In a second step, at least one piece of sub-running status information corresponding to the at least one piece of log information is combined to constitute the actual running status information of the target device.

When the sub-running status information refers to that the processor utilization rate is 80% and the memory utilization rate is 60%, the corresponding actual running status information may refer to that the processor utilization rate is 80% and the memory utilization rate is 60%.

Step 205, determining, in response to the actual running status information being different from the target running status information, status difference value information between the actual running status information and the target running status information.

When the actual running status information is different from the target running status information, it indicates that the target device may not reach a set target running status when running according to the running configuration template. In order to debug the target device, the executing body may first determine the status difference value information between the actual running status information and the target running status information. For example, the sub-running status information corresponding to the log information may refer to that the processor utilization rate is 80%. The sub-target running status information may refer to that the processor utilization rate is 85%. Accordingly, the corresponding status difference value information may be 5%.

Step 206, modifying the running configuration template through the status difference value information to obtain an updated running configuration template, and sending the updated running configuration template to the edge computing device, to cause the edge computing device to debug the target device.

After obtaining the status difference value information, the executing body may adjust the running configuration information in the running configuration template to obtain the updated running configuration template after the adjusting. Thereafter, the executing body may send the updated running configuration template to the edge computing device, to cause the edge computing device to debug the target device. This process is repeated until the running status of the target device satisfies the target running status information. It may be seen that, according to the present disclosure, the target device may be remotely debugged, which improves the efficiency of debugging the target device under the edge computing environment.

Figure 3:
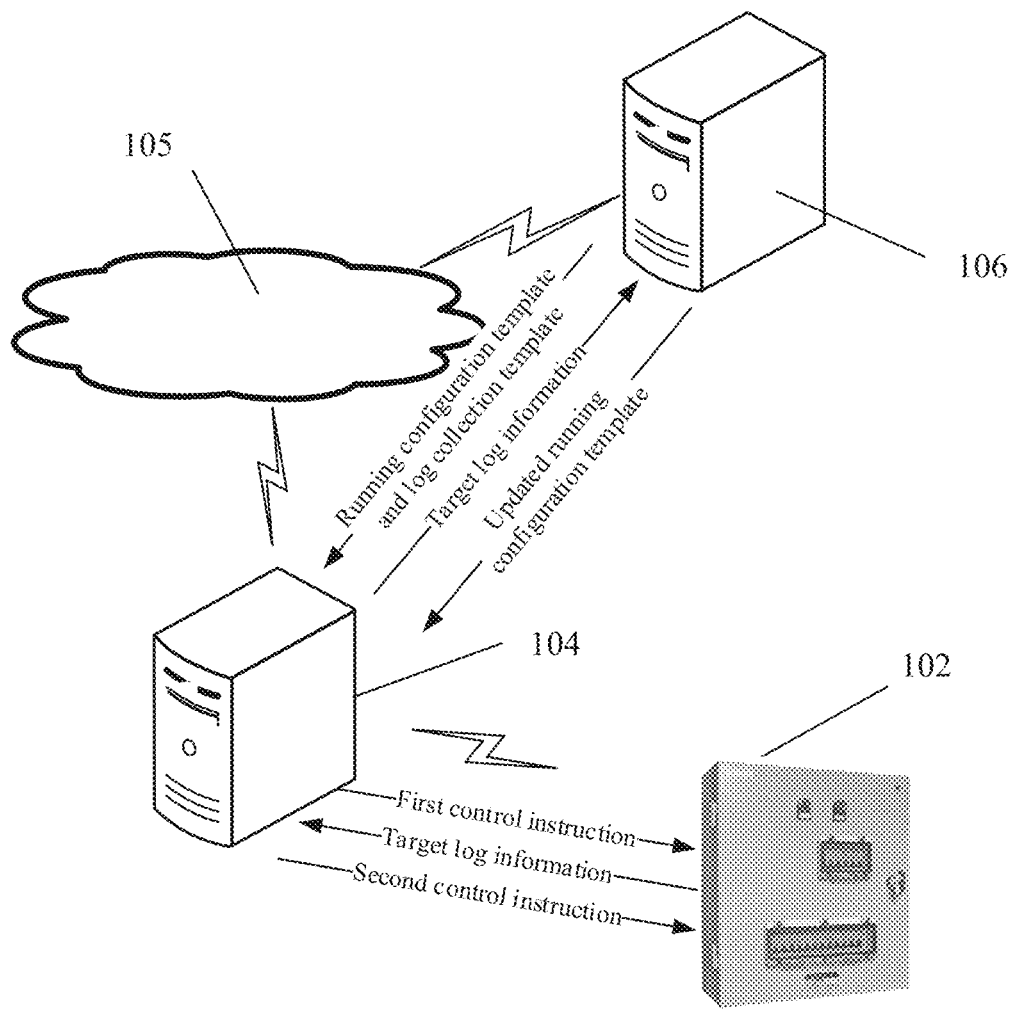
FIG. 3 is a schematic diagram of an application scenario of the method for debugging a device according to the present disclosure.

Further referring to FIG. 3, FIG. 3 is a schematic diagram of an application scenario of the method for debugging a device according to this embodiment. In the application scenario of FIG. 3, the cloud server 106 first acquires the target running status information of the terminal device 102, and constructs a running configuration template and a log collection template according to the target running status information. Then, the cloud server 106 sends the running configuration template and the log collection template to the edge computing device 104. The edge computing device 104 is communicated with the terminal device 102. After receiving the running configuration template and the log collection template, the edge computing device 104 generates a first control instruction, and sends the first control instruction to the terminal device 102. The terminal device 102 runs according to the first control instruction to generate target log information. After monitoring the target log information, the edge computing device 104 sends the target log information to the cloud server 106. The cloud server 106 determines the actual running status information of the terminal device 102 according to the target log information, and obtains an updated running configuration template according to the actual running status information. Then, the cloud server 106 sends the updated running configuration template to the edge computing device 104. The edge computing device 104 generates a second control instruction according to the updated running configuration template, such that the terminal device 102 runs according to the second control instruction. This process is repeated many times. Finally, the actual running status information of the terminal device 102 is the same as the target running status information, and thus, the remote debugging for the terminal device 102 under the edge computing environment is automatically completed.

According to the method provided in the above embodiment of the present disclosure, the target running status information of the target device is acquired, and the running configuration template and the log collection template are constructed according to the target running status information. The running configuration template and the log collection template are sent to the edge computing device, the target log information sent by the edge computing device is received, and then, the actual running status information is determined. When the actual running status information is different from the target running status information, the status difference value information is calculated. Finally, the running configuration template is modified through the status difference value information to obtain the updated running configuration template, and the updated running configuration template is sent to the edge computing device, to cause the edge computing device to debug the target device. According to the present disclosure, the target device may be remotely debugged, which improves the efficiency of debugging the target device under the edge computing environment.

Figure 4:
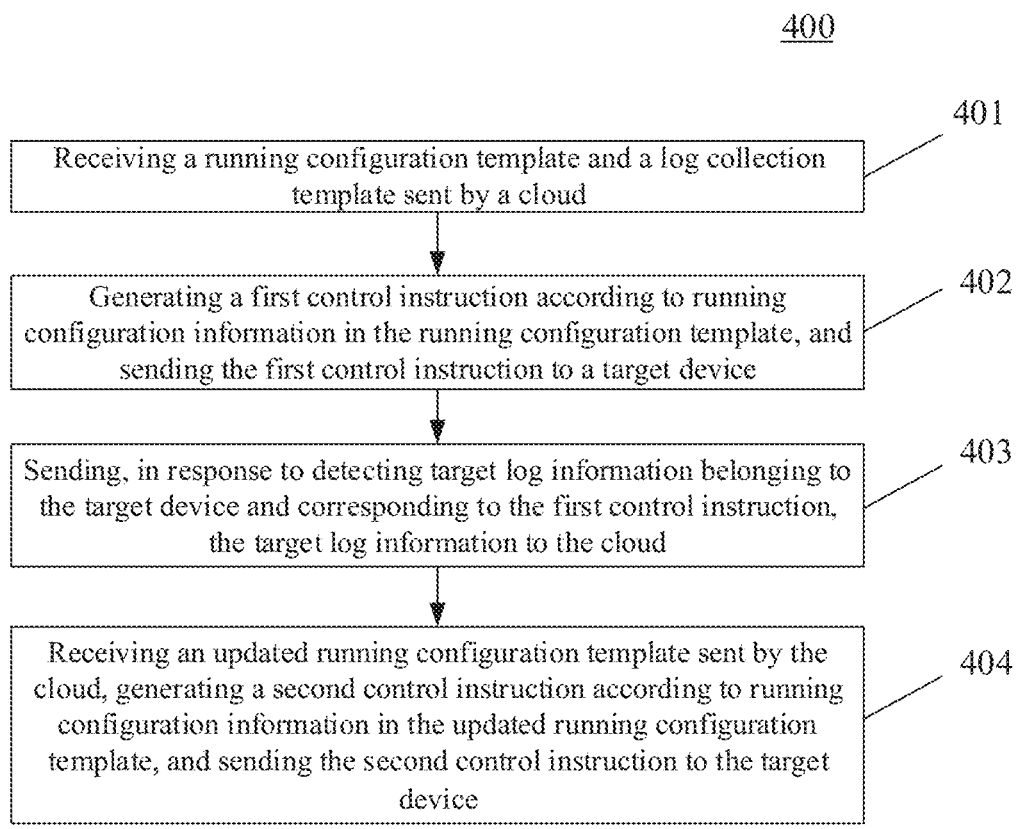
FIG. 4 is a flowchart of another embodiment of the method for debugging a device according to the present disclosure.

Further referring to FIG. 4, FIG. 4 illustrates a flow 400 of another embodiment of the method for debugging a device. The flow 400 of the method for debugging a device includes the following steps:

Step 401, receiving a running configuration template and a log collection template sent by a cloud.

In this embodiment, an executing body (e.g., the edge computing device 104 shown in FIG. 1) of the method for debugging a device may receive, by means of a wired connection or a wireless connection, the running configuration template and the log collection template that are sent by the cloud.

The executing body may exchange information with the cloud (i.e., the cloud server 106) via the network 105, and receive the running configuration template and the log collection template that are sent by the cloud. Here, the running configuration template may be used to specify at least one piece of running configuration information of the target device when running in a target running status. The log collection template may be used to instruct an edge computing device to collect at least one piece of target log information of the target device when running according to the running configuration information.

Step 402, generating a first control instruction according to running configuration information in the running configuration template, and sending the first control instruction to the target device.

After acquiring the running configuration template, the executing body may analyze the running configuration information from the running configuration template. Then, the executing body may query a corresponding control instruction of the running configuration information from the target device, and generate the first control instruction corresponding to the running configuration information. Thereafter, the executing body may send the first control instruction to the target device, to cause the target device to execute the first control instruction.

In some alternative implementations of this embodiment, the generating a first control instruction according to running configuration information in the running configuration template may include the following steps:

In a first step, the at least one piece of running configuration information is analyzed from the running configuration template.

In order to generate the first control instruction, the executing body may first analyze the at least one piece of running configuration information from the running configuration template.

In a second step, for running configuration information in the at least one piece of running configuration information, a first control sub-instruction corresponding to the running configuration information is generated.

The executing body may query the content corresponding to the running configuration information. For example, when the running configuration information refers to the working frequency of a processor, the content corresponding to the running configuration information may be "processor" and "frequency," and the executing body may query a control instruction corresponding to the processor from the target device. Then, the corresponding content in the control instruction is modified to "frequency," thereby obtaining the first control sub-instruction.

In some alternative implementations of this embodiment, the above method may further include the following steps:

In a first step, in response to sending the first control instruction to the target device, device log information of the target device is monitored.

After sending the first control instruction to the target device, the executing body may monitor the device log information of the target device, to acquire log information corresponding to the first control instruction.

In a second step, in response to detecting the device log information, at least one piece of log information being in the device log information and corresponding to the running configuration information is marked as target log information corresponding to the first control instruction.

The device log information of the target device generally contains a lot of information. In order to query the result of the execution for the first control instruction by the target device, the executing body may mark the at least one piece of log information being in the device log information and corresponding to the running configuration information as the target log information corresponding to the first control instruction.

Step 403, sending, in response to detecting target log information belonging to the target device and corresponding to the first control instruction, the target log information to the cloud.

When detecting the target log information generated after the target device executes the first control instruction, the executing body may send the target log information to the cloud.

In practice, when the information is sent to the cloud, it is further required to perform an operation such as a desensitization (sensitive information removal), a protocol analysis and a format conversion on the uploaded data, depending on actual requirements.

Step 404, receiving an updated running configuration template sent by the cloud, generating a second control instruction according to running configuration information in the updated running configuration template, and sending the second control instruction to the target device.

The cloud may modify the running configuration template according to the target log information to obtain the updated running configuration template, and send the updated running configuration template to the executing body. The executing body may generate the second control instruction again according to the running configuration information in the updated running configuration template, and send the second control instruction to the target device until the running status of the target device satisfies the target running status information. Accordingly, it is implemented that the cloud remotely debugs the target device, which improves the efficiency of debugging the target device under the edge computing environment.

Figure 5:
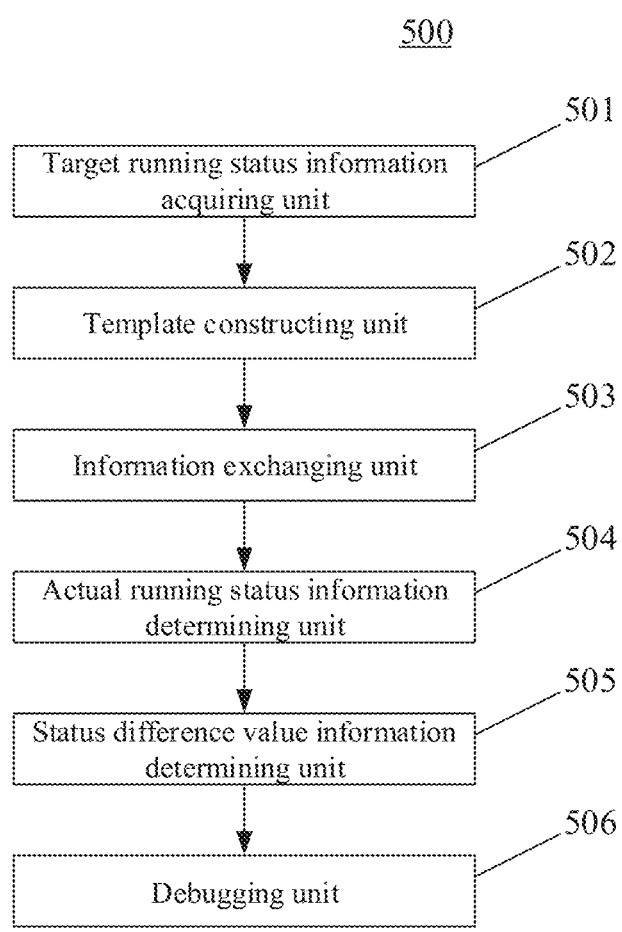
FIG. 5 is a schematic structural diagram of an embodiment of an apparatus for debugging a device according to the present disclosure.

Further referring to FIG. 5, as an implementation of the method shown in the above drawings, the present disclosure provides an embodiment of an apparatus for debugging a device. The embodiment of the apparatus corresponds to the embodiment of the method shown in FIG. 2, and the apparatus may be applied in various electronic devices.

As shown in FIG. 5, the apparatus 500 for debugging a device in this embodiment may include: a target running status information acquiring unit 501, a template constructing unit 502, an information exchanging unit 503, an actual running status information determining unit 504, a status difference value information determining unit 505, and a debugging unit 506. Here, the target running status information acquiring unit 501 is configured to acquire target running status information of a target device. The target running status information is used to represent a target running status of the target device when running normally. The template constructing unit 502 is configured to construct a running configuration template and a log collection template according to the target running status information. The running configuration template is used to specify at least one piece of running configuration information of the target device when running in the target running status, the log collection template is used to instruct an edge computing device to collect at least one piece of target log information of the target device when running according to the running configuration information, and the edge computing device is electrically connected with the target device. The information exchanging unit 503 is configured to send the running configuration template and the log collection template to the edge computing device, and receive target log information sent by the edge computing device. The actual running status information determining unit 504 is configured to determine actual running status information of the target device through the target log information. The status difference value information determining unit 505 is configured to determine, in response to the actual running status information being different from the target running status information, status difference value information between the actual running status information and the target running status information. The debugging unit 506 is configured to modify the running configuration template through the status difference value information to obtain an updated running configuration template, and send the updated running configuration template to the edge computing device, to cause the edge computing device to debug the target device.

In some alternative implementations of this embodiment, the target running status information acquiring unit 501 may include: a peak value information acquiring sub-unit (not shown) and a target running status information determining sub-unit (not shown). Here, the peak value information acquiring sub-unit is configured to acquire peak value information of the target device. The peak value information includes at least one of: a processor frequency peak value, a memory usage peak value, a network bandwidth peak value, or a failure-free time peak value. The target running status information determining sub-unit is configured to determine target running status information corresponding to the peak value information according to a set condition. The set condition includes at least one of a set threshold value or a target task, the set threshold value is used to represent a proportional relationship between the peak value information and the target running status information, and the target running status information includes at least one piece of sub-target running status information.

In some alternative implementations of this embodiment, the template constructing unit 502 may include: a device information acquiring sub-unit (not shown), a running configuration information matching sub-unit (not shown), and a running configuration template encapsulating sub-unit (not shown). Here, the device information acquiring sub-unit is configured to acquire device information of the target device. The device information includes at least one of hardware information or software information. The running configuration information matching sub-unit is configured to match the device information with the target running status information, to determine the at least one piece of running configuration information of the target device. The running configuration template encapsulating sub-unit is configured to encapsulate the at least one piece of running configuration information into the running configuration template.

In some alternative implementations of this embodiment, the template constructing unit 502 may include: a log information determining sub-unit (not shown), and a log collection template encapsulating sub-unit (not shown). Here, the log information determining sub-unit is configured to determine, for running configuration information in the at least one piece of running configuration information, log information corresponding to the running configuration information. The log collection template encapsulating sub-unit is configured to encapsulate at least one piece of log information corresponding to the at least one piece of running configuration information into the log collection template.

In some alternative implementations of this embodiment, the target log information includes at least one piece of log information. The actual running status information determining unit 504 may include: a sub-running status information querying sub-unit (not shown), and an information combining sub-unit (not shown). Here, the sub-running status information querying sub-unit is configured to query, for log information in the at least one piece of log information in the target log information, sub-running status information corresponding to the log information. The information combining sub-unit is configured to combine at least one piece of sub-running status information corresponding to the at least one piece of log information to constitute the actual running status information of the target device.

Figure 6:
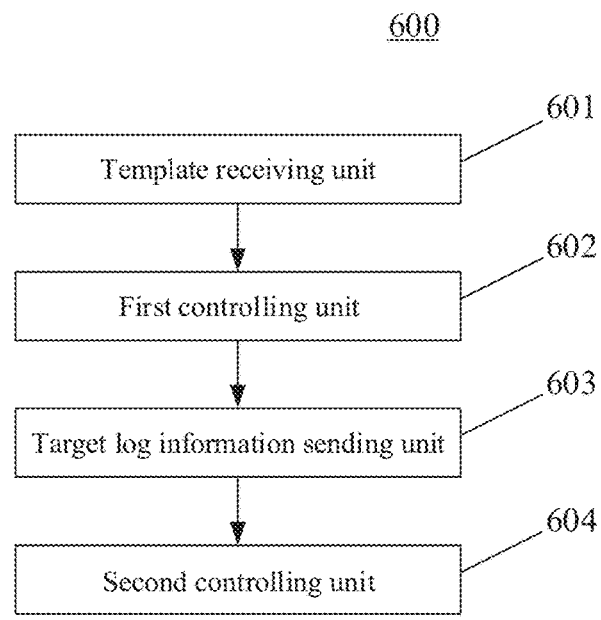
FIG. 6 is a schematic structural diagram of another embodiment of the apparatus for debugging a device according to the present disclosure.

Further referring to FIG. 6, as an implementation of the method shown in the above drawings, the present disclosure provides an embodiment of an apparatus for debugging a device. The embodiment of the apparatus corresponds to the embodiment of the method shown in FIG. 4, and the apparatus may be applied in various electronic devices.

As shown in FIG. 6, the apparatus 600 for debugging a device in this embodiment may include: a template receiving unit 601, a first controlling unit 602, a target log information sending unit 603 and a second controlling unit 604. Here, the template receiving unit 601 is configured to receive a running configuration template and a log collection template sent by a cloud. The running configuration template is used to specify at least one piece of running configuration information of the target device when running in a target running status, and the log collection template is used to instruct an edge computing device to collect at least one piece of target log information of the target device when running according to the running configuration information. The first controlling unit 602 is configured to generate a first control instruction according to running configuration information in the running configuration template, and send the first control instruction to the target device. The target log information sending unit 603 is configured to send, in response to detecting target log information belonging to the target device and corresponding to the first control instruction, the target log information to the cloud. The second controlling unit 604 is configured to receive an updated running configuration template sent by the cloud, generate a second control instruction according to running configuration information in the updated running configuration template, and send the second control instruction to the target device.

In some alternative implementations of this embodiment, the first controlling unit 602 may include: a running configuration information analyzing sub-unit (not shown) and a first control sub-instruction generating sub-unit (not shown). Here, the running configuration information analyzing sub-unit is configured to analyze the at least one piece of running configuration information from the running configuration template. The first control sub-instruction generating sub-unit is configured to generate, for running configuration information in the at least one piece of running configuration information, a first control sub-instruction corresponding to the running configuration information.

In some alternative implementations of this embodiment, the apparatus 600 for debugging a device may further include: a device log information monitoring unit (not shown) and a target log information screening unit (not shown). Here, the device log information monitoring unit is configured to monitor, in response to sending the first control instruction to the target device, device log information of the target device. The target log information screening unit is configured to mark, in response to detecting the device log information, at least one piece of log information being in the device log information and corresponding to the running configuration information as the target log information corresponding to the first control instruction.

The present disclosure further provides an electronic device, including one or more processors and a storage device storing one or more programs. The one or more programs, when executed by the one or more processors, cause the one or more processors to perform the method for debugging a device.

The present disclosure further provides a computer readable medium storing a computer program. The program, when executed by a processor, implements the method for debugging a device.

Figure 7:
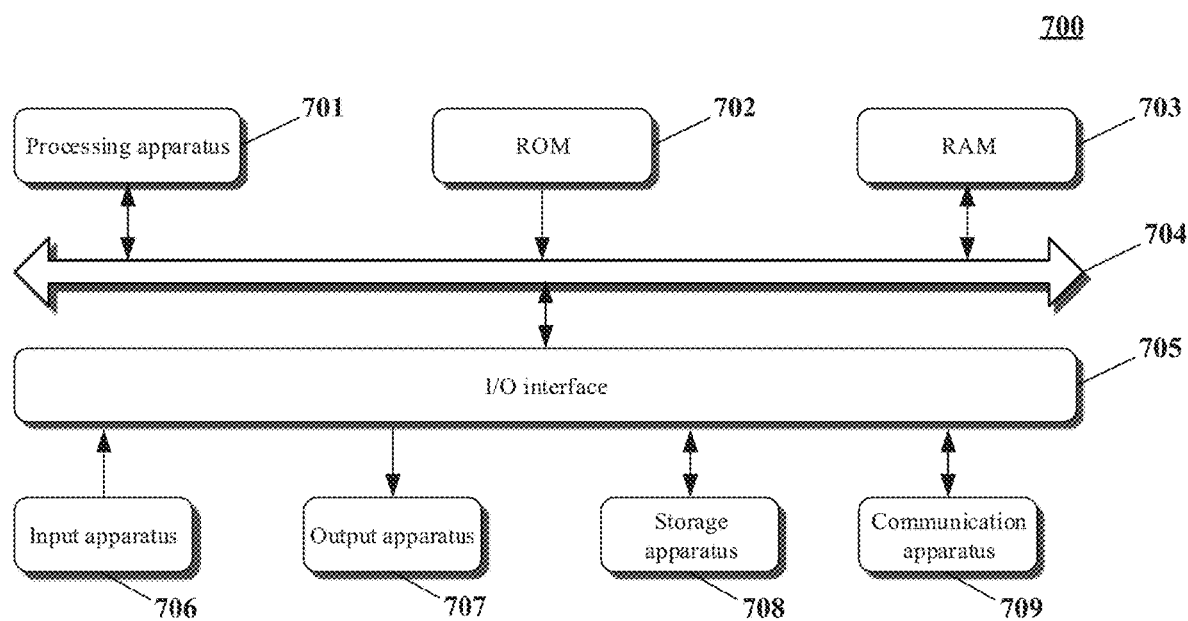
FIG. 7 is a schematic structural diagram of an electronic device adapted to implement the embodiments of the present disclosure.

Further referring to FIG. 7, FIG. 7 is a schematic structural diagram of a electronic device 700 of an electronic device (e.g., the cloud server 106 shown in FIG. 1) adapted to implement the embodiments of the present disclosure. The electronic device shown in FIG. 7 is merely an example, and should not bring any limitations to the functions and the scope of use of the embodiments of the present disclosure.

As shown in FIG. 7, the electronic device 700 includes a processing apparatus (e.g., a central processing unit and a graphics processing unit) 701, which may execute various appropriate actions and processes in accordance with a program stored in a read-only memory (ROM) 702 or a program loaded into a random access memory (RAM) 703 from a storage apparatus 708. The RAM 703 also stores various programs and data required by operations of the electronic device 700. The processing apparatus 701, the ROM 702 and the RAM 703 are connected to each other through a bus 704. An input/output (I/O) interface 705 is also connected to the bus 704.

Generally, the following devices may be connected to the I/O interface 705: an input portion 706 including such as a touch screen, a touch pad, a keyboard, a mouse, a camera, a microphone, an accelerometer, a gyroscope, etc.; an output portion 707 including such as a liquid crystal display device (LCD), a speaker, a vibrator, etc.; a storage portion 708; and a communication device 709. The communication device 709 may allow the electronic device 700 to perform wireless or wired communication with other devices to exchange data. Although FIG. 7 shows an electronic device 700 having various devices, it should be understood that it is not required to implement or have all of the illustrated devices. It may alternatively be implemented or provided with more or fewer devices. Each block shown in FIG. 7 may represent one device, or may represent multiple devices as needed.

In particular, according to the embodiments of the present disclosure, the process described above with reference to the flow chart may be implemented in a computer software program. For example, an embodiment of the present disclosure includes a computer program product, which includes a computer program that is tangibly embedded in a computer readable medium. The computer program includes program codes for performing the method as illustrated in the flow chart. In such an embodiment, the computer program may be downloaded and installed from a network via the communication portion 709, or may be installed from the storage portion 708 or ROM 702. The computer program, when executed by the processing apparatus 701, implements the above-mentioned functionalities as defined by the method of the present disclosure.

It should be noted that the above-mentioned computer readable medium in the embodiments of the present disclosure may be a computer readable signal medium or a computer readable storage medium, or any combination of the two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In the present disclosure, the computer readable storage medium may be any physical medium containing or storing programs which may be used by a command execution system, apparatus or element or incorporated thereto. In the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that may be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wired, optical cable, RF (Radio Frequency) medium etc., or any suitable combination of the above.

The computer readable medium may be the computer readable medium included in the electronic device, or a stand-alone computer readable medium not assembled into the electronic device. The computer readable medium carries one or more programs. The one or more programs, when executed by the electronic device, cause the electronic device to: acquire target running status information of a target device, the target running status information being used to represent a target running status of the target device when running normally; construct a running configuration template and a log collection template according to the target running status information, wherein the running configuration template is used to specify at least one piece of running configuration information of the target device when running in the target running status, the log collection template is used to instruct an edge computing device to collect at least one piece of target log information of the target device when running according to the running configuration information, and the edge computing device is electrically connected with the target device; send the running configuration template and the log collection template to the edge computing device, and receive target log information sent by the edge computing device; determine actual running status information of the target device through the target log information; determine, in response to the actual running status information being different from the target running status information, status difference value information between the actual running status information and the target running status information; and modify the running configuration template through the status difference value information to obtain an updated running configuration template, and send the updated running configuration template to the edge computing device, to cause the edge computing device to debug the target device.

A computer program code for performing operations in the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the accompanying drawings. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system performing specified functions or operations, or by a combination of a dedicated hardware and computer instructions.

The units involved in the embodiments of the present disclosure may be implemented by means of software or hardware. The described units may also be provided in a processor. For example, the processor may be described as: a processor comprising a target running status information acquiring unit, a template constructing unit, an information exchanging unit, an actual running status information determining unit, a status difference value information determining unit, and a debugging unit. Here, the names of these units do not in some cases constitute a limitation to such units themselves. For example, the debugging unit may alternatively be described as "a unit for debugging a target device."

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:

1. A method for debugging a device, comprising:
   acquiring target running status information of a target device, wherein the target running status information of the target device is used to represent a target running status of the target device when running normally;
   constructing a running configuration template and a log collection template according to the target running status information of the target device, wherein the running configuration template is used to specify at least one piece of running configuration information of the target device when running in the target running status, wherein the log collection template is used to instruct an edge computing device to collect at least one piece of target log information of the target device when running according to the running configuration information, and wherein the edge computing device is electrically connected with the target device;
   sending the running configuration template and the log collection template to the edge computing device, and receiving target log information sent by the edge computing device;
   determining actual running status information of the target device through the target log information;
   determining, in response to the actual running status information of the target device being different from the target running status information of the target device, status difference value information between the actual running status information of the target device and the target running status information of the target device; and
   modifying the running configuration template through the status difference value information to obtain an updated running configuration template, and sending the updated running configuration template to the edge computing device, to cause the edge computing device to debug the target device.

2. The method according to claim 1, wherein the acquiring target running status information of a target device comprises:
   acquiring peak value information of the target device, wherein the peak value information of the target device comprises at least one of: a processor frequency peak value, a memory usage peak value, a network bandwidth peak value, or a failure-free time peak value; and
   determining the target running status information of the target device corresponding to the peak value information of the target device according to a set condition, wherein the set condition comprises at least one of a set threshold value or a target task, wherein the set threshold value is used to represent a proportional relationship between the peak value information of the target device and the target running status information of the target device, and wherein the target running status information of the target device comprises at least one piece of sub-target running status information of the target device.

3. The method according to claim 1, wherein the constructing a running configuration template and a log collection template according to the target running status information of the target device comprises:
   acquiring device information of the target device, wherein the device information of the target device comprises at least one of hardware information or software information;
   matching the device information of the target device with the target running status information of the target device, to determine the at least one piece of running configuration information of the target device; and
   encapsulating the at least one piece of running configuration information of the target device into the running configuration template.

4. The method according to claim 3, wherein the constructing a running configuration template and a log collection template according to the target running status information of the target device comprises:
   determining, for running configuration information in the at least one piece of running configuration information of the target device, log information corresponding to the running configuration information; and
   encapsulating at least one piece of log information corresponding to the at least one piece of running configuration information of the target device into the log collection template.

5. The method according to claim 1, wherein the target log information comprises at least one piece of log information, and wherein the determining actual running status information of the target device through the target log information comprises:
   querying, for log information in the at least one piece of log information in the target log information, sub-running status information of the target device corresponding to the log information; and
   combining at least one piece of sub-running status information of the target device corresponding to the at least one piece of log information to constitute the actual running status information of the target device.

6. A non-transitory computer readable storage medium, storing a computer program, wherein the computer program, when executed by a processor, implements the method according to claim 1.

7. The non-transitory computer readable storage medium according to claim 6, wherein the acquiring target running status information of a target device comprises:
   acquiring peak value information of the target device, wherein the peak value information of the target device comprises at least one of: a processor frequency peak value, a memory usage peak value, a network bandwidth peak value, or a failure-free time peak value; and
   determining the target running status information of the target device corresponding to the peak value information of the target device according to a set condition, wherein the set condition comprises at least one of a set threshold value or a target task, wherein the set threshold value is used to represent a proportional relationship between the peak value information of the target device and the target running status information of the target device, and wherein the target running status information of the target device comprises at least one piece of sub-target running status information of the target device.

8. The non-transitory computer readable storage medium according to claim 7, wherein the constructing a running configuration template and a log collection template according to the target running status information of the target device comprises:
- acquiring device information of the target device, wherein the device information of the target device comprises at least one of hardware information or software information;
- matching the device information of the target device with the target running status information of the target device, to determine the at least one piece of running configuration information of the target device; and
- encapsulating the at least one piece of running configuration information of the target device into the running configuration template.

9. A method for debugging a device, comprising:
- receiving a running configuration template and a log collection template sent by a cloud, wherein the running configuration template is used to specify at least one piece of running configuration information of a target device when running in a target running status, and wherein the log collection template is used to instruct an edge computing device to collect at least one piece of target log information of the target device when running according to the at least one piece of running configuration information of the target device;
- generating a first control instruction according to the at least one piece of running configuration information of the target device in the running configuration template, and sending the first control instruction to the target device;
- sending, in response to detecting the at least one piece of target log information of the target device and corresponding to the first control instruction, the at least one piece of target log information of the target device to the cloud; and
- receiving an updated running configuration template sent by the cloud, generating a second control instruction according to the at least one piece of running configuration information of the target device in the updated running configuration template, and sending the second control instruction to the target device, to debug the target device.

10. The method according to claim 9, wherein the generating a first control instruction according to the at least one piece of running configuration information of the target device in the running configuration template comprises:
- analyzing the at least one piece of running configuration information of the target device from the running configuration template; and
- generating, for running configuration information in the at least one piece of running configuration information of the target device, a first control sub-instruction corresponding to the running configuration information in the at least one piece of running configuration information of the target device.

11. The method according to claim 9, further comprising:
- monitoring, in response to sending the first control instruction to the target device, device log information of the target device; and
- marking, in response to detecting the device log information of the target device, at least one piece of log information being in the device log information of the target device and corresponding to the running configuration information in the at least one piece of running configuration information of the target device as the at least one piece of target log information of the target device corresponding to the first control instruction.

12. An electronic device, comprising:
- one or more processors; and
- a storage device, configured to store one or more programs,
- wherein the one or more programs, when executed by the one or more processors, cause the one or more processors to perform the method according to claim 9.

13. The electronic device according to claim 12, wherein the generating a first control instruction according to the at least one piece of running configuration information of the target device in the running configuration template comprises:
- analyzing the at least one piece of running configuration information of the target device from the running configuration template; and
- generating, for running configuration information in the at least one piece of running configuration information of the target device, a first control sub-instruction corresponding to the running configuration information in the at least one piece of running configuration information of the target device.

14. The electronic device according to claim 12, further comprising:
- monitoring, in response to sending the first control instruction to the target device, device log information of the target device; and
- marking, in response to detecting the device log information of the target device, at least one piece of log information being in the device log information of the target device and corresponding to the running configuration information in the at least one piece of running configuration information of the target device as the at least one piece of target log information of the target device corresponding to the first control instruction.

15. A non-transitory computer readable storage medium, storing a computer program, wherein the computer program, when executed by a processor, implements the method according to claim 6.

16. An electronic device, comprising:
- one or more processors; and
- a storage device, configured to store one or more programs,
- wherein the one or more programs, when executed by the one or more processors, cause the one or more processors to perform operations for processing information, comprising:
- acquiring target running status information of a target device, wherein the target running status information of the target device is used to represent a target running status of the target device when running normally;
- constructing a running configuration template and a log collection template according to the target running status information of the target device, wherein the running configuration template is used to specify at least one piece of running configuration information of the target device when running in the target running status, wherein the log collection template is used to instruct an edge computing device to collect at least one piece of target log information of the target device when running according to the running configuration information, and wherein the edge computing device is electrically connected with the target device;

sending the running configuration template and the log collection template to the edge computing device, and receiving target log information sent by the edge computing device;

determining actual running status information of the target device through the target log information;

determining, in response to the actual running status information of the target device being different from the target running status information of the target device, status difference value information between the actual running status information of the target device and the target running status information of the target device; and modifying the running configuration template through the status difference value information to obtain an updated running configuration template, and sending the updated running configuration template to the edge computing device, to cause the edge computing device to debug the target device.

17. The electronic device according to claim 16, wherein the acquiring target running status information of a target device comprises:

acquiring peak value information of the target device, wherein the peak value information of the target device comprises at least one of: a processor frequency peak value, a memory usage peak value, a network bandwidth peak value, or a failure-free time peak value; and determining the target running status information of the target device corresponding to the peak value information of the target device according to a set condition, wherein the set condition comprises at least one of a set threshold value or a target task, wherein the set threshold value is used to represent a proportional relationship between the peak value information of the target device and the target running status information of the target device, and wherein the target running status information of the target device comprises at least one piece of sub-target running status information of the target device.

18. The electronic device according to claim 16, wherein the constructing a running configuration template and a log collection template according to the target running status information of the target device comprises:

acquiring device information of the target device, wherein the device information of the target device comprises at least one of hardware information or software information;

matching the device information of the target device with the target running status information of the target device, to determine the at least one piece of running configuration information of the target device; and encapsulating the at least one piece of running configuration information of the target device into the running configuration template.

19. The electronic device according to claim 18, wherein the constructing a running configuration template and a log collection template according to the target running status information of the target device comprises:

determining, for running configuration information in the at least one piece of running configuration information of the target device, log information corresponding to the running configuration information; and encapsulating at least one piece of log information corresponding to the at least one piece of running configuration information of the target device into the log collection template.

20. The electronic device according to claim 16, wherein the target log information comprises at least one piece of log information, and wherein the determining actual running status information of the target device through the target log information comprises:

querying, for log information in the at least one piece of log information in the target log information, sub-running status information of the target device corresponding to the log information; and combining at least one piece of sub-running status information of the target device corresponding to the at least one piece of log information to constitute the actual running status information of the target device.

\* \* \* \* \*